US012719295B2

(12) United States Patent
Song et al.

(10) Patent No.: US 12,719,295 B2
(45) Date of Patent: Aug. 25, 2026

(54) POWER SUPPLY CIRCUIT FOR INDEPENDENT CONTROL AND MONITORING OF MULTI-BATTERY CHARGING

(71) Applicant: QUALCOMM Incorporated, San Diego, CA (US)

(72) Inventors: Chunping Song, Palo Alto, CA (US); Georgios Konstantinos Paparrizos, Foster City, CA (US); Xinying Ding, Sunnyvale, CA (US); Jiwei Chen, San Jose, CA (US); Guoyong Guo, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 781 days.

(21) Appl. No.: 18/173,518

(22) Filed: Feb. 23, 2023

(65) Prior Publication Data

US 2024/0291284 A1 Aug. 29, 2024

(51) Int. Cl.

| | |
|---|---|
| ***H02J 7/00*** | (2026.01) |
| ***H02J 7/14*** | (2006.01) |
| ***H02J 7/50*** | (2026.01) |
| ***H02J 7/80*** | (2026.01) |
| ***H02J 7/90*** | (2026.01) |
| ***H02M 3/158*** | (2006.01) |
| *H02M 3/07* | (2006.01) |

(52) U.S. Cl.

CPC .................. *H02J 7/50* (2026.01); *H02J 7/80* (2026.01); *H02J 7/90* (2026.01); *H02M 3/158* (2013.01); *H02J 2207/20* (2020.01); *H02M 3/07* (2013.01)

(58) Field of Classification Search

CPC ........ H02J 7/0013; H02J 7/0047; H02J 7/007; H02J 2207/20; H02M 3/158; H02M 3/07

USPC .......................................................... 320/109

See application file for complete search history.

(56) References Cited

U.S. PATENT DOCUMENTS

| | | | | |
|---|---|---|---|---|
| 6,850,039 | B2 * | 2/2005 | Popescu ................ | H02J 7/0013 320/136 |
| 10,003,261 | B2 * | 6/2018 | Petersen ................. | H02M 3/07 |
| 10,553,915 | B1 * | 2/2020 | Li ....................... | H02J 7/00714 |
| 11,495,978 | B2 * | 11/2022 | Baby ..................... | G06F 1/1635 |
| 11,509,146 | B1 * | 11/2022 | Zhang ................. | H02J 7/00714 |

(Continued)

OTHER PUBLICATIONS

International Search Report and Written Opinion—PCT/US2024/015172—ISA/EPO—Jul. 15, 2024.

*Primary Examiner* — Alexis B Pacheco

(74) *Attorney, Agent, or Firm* — Gerald P. Joyce, III

(57) ABSTRACT

Certain aspects of the present disclosure provide techniques and apparatus for supplying power, including battery charging. One example power supply circuit generally includes a switching regulator including an output node; a first battery node for coupling to a first battery; a second battery node for coupling to a second battery; a first switch coupled between the output node of the switching regulator and the first battery node; and a second switch coupled between the output node of the switching regulator and the second battery node. Such a power supply circuit may independently control and monitor the charging of multiple independent batteries without using multiple chargers, may balance the batteries during discharging, and may operate without a current limit switch.

28 Claims, 9 Drawing Sheets

(56) References Cited

U.S. PATENT DOCUMENTS

| | | | | |
|---|---|---|---|---|
| 11,677,260 | B2 * | 6/2023 | Li | H02J 7/342<br>320/116 |
| 2004/0113585 | A1 * | 6/2004 | Stanesti | H02J 7/02<br>320/116 |
| 2008/0106234 | A1 * | 5/2008 | Yun | H02J 7/00047<br>320/124 |
| 2011/0001456 | A1 * | 1/2011 | Wang | H02J 7/0016<br>320/117 |
| 2011/0095729 | A1 * | 4/2011 | Tsuji | H02J 7/0068<br>320/162 |
| 2016/0036251 | A1 * | 2/2016 | Ma | H02J 7/0024<br>320/117 |
| 2016/0126766 | A1 * | 5/2016 | Zhang | H02J 7/00<br>320/116 |
| 2018/0170205 | A1 * | 6/2018 | Yoon | B60L 58/20 |
| 2019/0148795 | A1 | 5/2019 | Hawley et al. | |
| 2019/0214832 | A1 * | 7/2019 | Li | H02J 7/0024 |
| 2022/0231518 | A1 | 7/2022 | Kun et al. | |
| 2022/0311339 | A1 * | 9/2022 | Yen | H02M 3/158 |
| 2023/0268763 | A1 * | 8/2023 | Li | H02J 7/342<br>320/116 |
| 2024/0356437 | A1 * | 10/2024 | Paparrizos | H02J 7/007 |

* cited by examiner

POWER SUPPLY CIRCUIT FOR INDEPENDENT CONTROL AND MONITORING OF MULTI-BATTERY CHARGING

TECHNICAL FIELD

Certain aspects of the present disclosure generally relate to power supply circuits and, more particularly, to techniques and apparatus for independently controlling the charging and managing of multiple independent batteries.

BACKGROUND

A voltage regulator ideally provides a constant direct current (DC) output voltage regardless of changes in load current or input voltage. Voltage regulators may be classified as linear regulators or switching regulators. While linear regulators tend to be relatively compact, many applications may benefit from the increased efficiency of a switching regulator. A linear regulator may be implemented by a low-dropout (LDO) regulator, for example. A switching regulator (also known as a "switching converter" or "switcher") may be implemented, for example, by a switched-mode power supply (SMPS), such as a buck converter, a boost converter, a buck-boost converter, or a charge pump.

For example, a buck converter is a type of SMPS typically comprising: (1) a high-side switch coupled between a relatively higher voltage rail and a switching node, (2) a low-side switch coupled between the switching node and a relatively lower voltage rail, (3) and an inductor coupled between the switching node and a load (e.g., represented by a shunt capacitive element). The high-side and low-side switches are typically implemented with transistors, although the low-side switch may alternatively be implemented with a diode.

A charge pump is a type of SMPS typically comprising at least one switching device to control the connection of a supply voltage across a load through a capacitor. In a voltage doubler (also referred to as a "multiply-by-two (X2) charge pump"), for example, the capacitor of the charge pump circuit may initially be connected across the supply, charging the capacitor to the supply voltage. The charge pump circuit may then be reconfigured to connect the capacitor in series with the supply and the load, doubling the voltage across the load. This two-stage cycle is repeated at the switching frequency for the charge pump. Charge pumps may be used to multiply or divide voltages by integer or fractional amounts, depending on the circuit topology.

Power management integrated circuits (power management ICs or PMICs) are used for managing the power scheme of a host system and may include and/or control one or more voltage regulators (e.g., buck converters or charge pumps). A PMIC may be used in battery-operated devices, such as mobile phones, tablets, laptops, wearables, etc., to control the flow and direction of electrical power in the devices. The PMIC may perform a variety of functions for the device such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features are discussed briefly below. After considering this discussion, and particularly after reading the section entitled "Detailed Description," one will understand how the features of this disclosure provide the advantages described herein.

Certain aspects of the present disclosure provide a power supply circuit. The power supply circuit generally includes a switching regulator including an output node; a first battery node for coupling to a first battery; a second battery node for coupling to a second battery; a first switch coupled between the output node of the switching regulator and the first battery node; and a second switch coupled between the output node of the switching regulator and the second battery node.

Certain aspects of the present disclosure provide a power management integrated circuit (PMIC) comprising at least a portion of the power supply circuit described above.

Certain aspects of the present disclosure provide a battery charging circuit comprising the power supply circuit described above.

Certain aspects of the present disclosure provide a device. The device generally includes a switching regulator including an output node, a first battery, a second battery, a first switch coupled between the output node of the switching regulator and the first battery, and a second switch coupled between the output node of the switching regulator and the second battery.

Certain aspects of the present disclosure are directed to a method of supplying power. The method generally includes converting a first voltage to a second voltage via a first switching regulator, charging a first battery from an output of the first switching regulator via a first switch, and charging a second battery from the output of the first switching regulator via a second switch, the second switch being different from the first switch.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
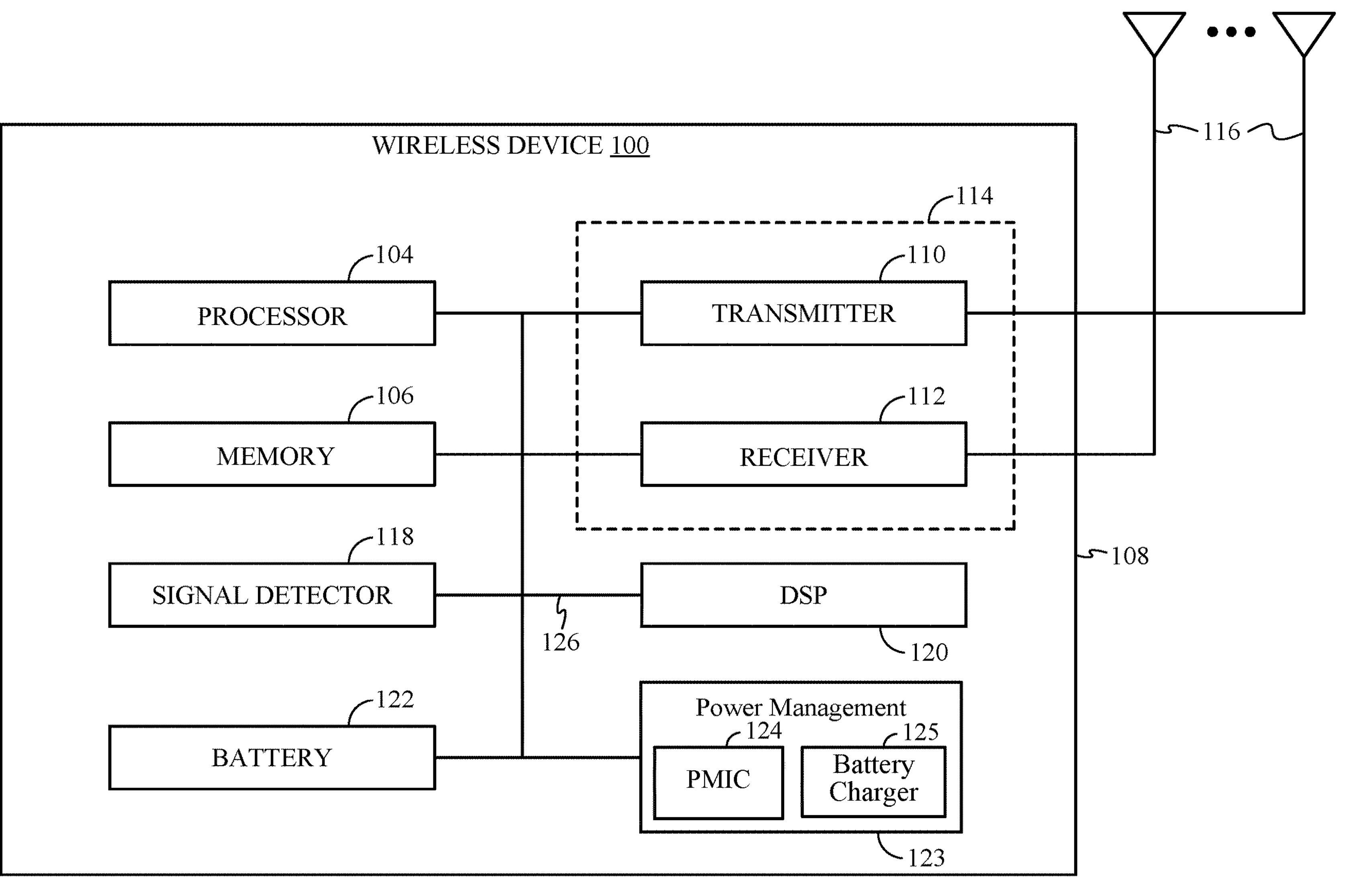
FIG. 1 is a block diagram of an example device comprising a power management system that includes a power management integrated circuit (PMIC) and a battery charging circuit, in which aspects of the present disclosure may be practiced.

Certain aspects of the present disclosure provide techniques and apparatus for independently controlling the charging and managing of multiple independent batteries using a power supply circuit that includes a switching regulator and multiple independently controlled and monitored charging paths. Such a power supply circuit may independently control and monitor the charging of multiple independent batteries without using multiple chargers and may balance the batteries during discharging. In some aspects, the power supply circuit may operate without impedance balancing circuitry (e.g., a current limit switch).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in any of various suitable apparatus, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDAs), and the like.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, an Internet of things (IoT) device, a wearable device, etc. For certain aspects, the device 100 may be a foldable device (e.g., a flip phone).

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122, which may be used to power the various components of the device 100 (e.g., when another power source-such as a wall adapter or a wireless power charger—is unavailable). The battery 122 may comprise a single cell or multiple cells connected in series and/or in parallel. The device 100 may further include additional independent batteries (not shown). Each of the additional independent batteries may comprise a single cell or multiple cells connected in series and/or in parallel.

The device 100 may also include a power management system 123 for managing the power from the battery 122 (or batteries), a wall adapter, and/or a wireless power charger to the various components of the device 100. The power management system 123 may perform a variety of functions for the device such as DC-to-DC conversion, battery charging, power-source selection, voltage scaling, power sequencing, source mode power, etc. In certain aspects, the power management system 123 may include a power management integrated circuit (power management IC or PMIC) 124 and one or more power supply circuits, such as a battery charger 125, which may be controlled by the PMIC or logic associated with the battery charger, for example. For certain aspects, at least a portion of one or more of the power supply circuits may be integrated in the PMIC 124. The PMIC 124 and/or the one or more power supply circuits may include at least a portion of a switched-mode power supply (SMPS) circuit, which may be implemented by any of various suitable switched-mode power supply circuit topologies, such as a two-level buck converter, a three-level buck converter, a charge pump, or an adaptive combination power supply circuit (e.g., the SMPS circuit 214 of FIG. 2), which can switch between operating in a buck converter mode and a charge pump mode, as described below.

The various components of the device 100 may be coupled together by a bus system 126, which may include a power bus, a control signal bus, and/or a status signal bus in addition to a data bus. Additionally or alternatively, various combinations of the components of the device 100 may be coupled together by one or more other suitable techniques.

Example Power Supply Circuits and Operation

As described above, the PMIC 124 and/or the one or more power supply circuits (e.g., battery charger 125) may include at least a portion of an SMPS circuit (e.g., a buck converter, a charge pump converter, or an adaptive combination power supply circuit capable of switching therebetween), which may be a single-phase or multi-phase converter. In the case of an adaptive combination power supply circuit, both converter modes may be single-phase, both converter modes may be multi-phase, one converter mode may be single-phase while the other converter mode is multi-phase or capable of changing between single-phase and multi-phase, or one converter mode may be multi-phase while the other converter mode is capable of changing between single-phase and multi-phase.

Figure 2:
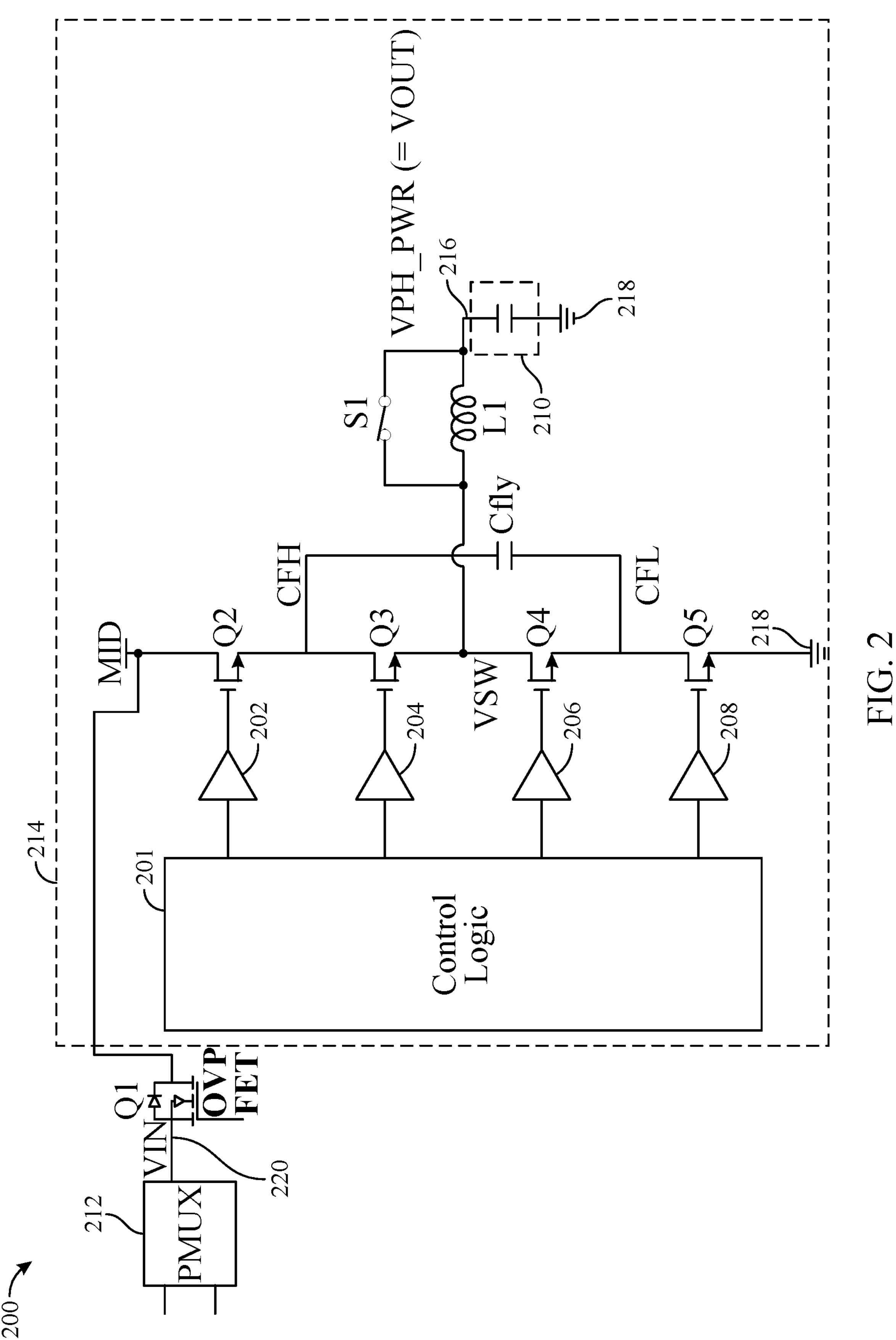
FIG. 2 is a circuit diagram of an example power supply circuit, in accordance with certain aspects of the present disclosure.

FIG. 2 is a circuit diagram of an example power supply circuit 200, which may be used to charge one or more batteries. As illustrated, the power supply circuit 200 includes a power multiplexer 212 (labeled "PMUX"), a reverse-current-blocking transistor Q1 (which may also be referred to as an overvoltage protection (OVP) field-effect transistor (FET)), and an SMPS circuit 214 (e.g., an adaptive SMPS circuit).

The power multiplexer 212 may be configured to select between receiving power from, for example, (i) a Universal Serial Bus (USB) port for connecting to a wall adapter and (ii) a wireless power port (both not shown). The power multiplexer 212 may be implemented as a single-pole, double-throw (SPDT) switch by two OVP FETs, and in this case, transistor Q1 may be eliminated.

In certain aspects, the output of the power multiplexer 212 may be coupled to an input voltage node 220 (labeled "VIN"). The input voltage node 220 may be coupled to a source of the OVP FET Q1, and a drain of the OVP FET Q1 may be coupled to a voltage node (labeled "MID") of the SMPS circuit 214. The MID voltage node may serve as the power supply rail of the SMPS circuit 214, and in some cases, may alternatively be considered as an input node of the SMPS circuit. In some cases, the power multiplexer 212 and/or transistor Q1 may be removed.

For certain aspects, the SMPS circuit 214 may have a two-level buck converter topology. For other aspects, the SMPS circuit 214 may have a single-phase three-level buck converter topology (as illustrated in the power supply circuit 200 of FIG. 2), and may include a second transistor Q2, a third transistor Q3, a fourth transistor Q4, a fifth transistor Q5, a flying capacitive element Cfly, an inductive element L1, and a load 210, which is represented here by a capacitor. To realize an adaptive SMPS circuit, a switch S1 may be added across the inductive element L1 of the three-level buck converter topology. With the switch S1 closed, the adaptive SMPS circuit may function as a single-phase divide-by-two (Div2) charge pump converter, as further described below. In certain aspects, switch S1 may be implemented by two back-to-back transistors.

Transistor Q3 may be coupled to transistor Q2 via a first node (labeled "CFH" for flying capacitor high node), transistor Q4 may be coupled to transistor Q3 via a second node (labeled "VSW" for voltage switching node), and transistor Q5 may be coupled to transistor Q4 via a third node (labeled "CFL" for flying capacitor low node). For certain aspects, the transistors Q2-Q5 may be implemented as n-type metal-oxide-semiconductor (NMOS) transistors, as illustrated in FIG. 2. In this case, the drain of transistor Q3 may be coupled to the source of transistor Q2, the drain of transistor Q4 may be coupled to the source of transistor Q3, and the drain of transistor Q5 may be coupled to the source of transistor Q4. The source of transistor Q5 may be coupled to a reference potential node 218 (e.g., electric ground) for the power supply circuit 200. The flying capacitive element Cfly may have a first terminal coupled to the first node and a second terminal coupled to the third node. The inductive element L1 may have a first terminal coupled to the second node and a second terminal coupled to an output voltage node 216 (labeled "VOUT," which may also be referred to as "VPH_PWR" or "VPH") and the load 210.

Control logic 201 may control operation of the SMPS circuit 214 and other aspects of the power supply circuit 200. For example, the control logic 201 may control operation of the transistors Q2-Q5 via output signals to the inputs of respective gate drivers 202, 204, 206, and 208. The outputs of the gate drivers 202, 204, 206, and 208 are coupled to respective gates of transistors Q2-Q5. During operation of the adaptive SMPS circuit (or of a three-level buck converter), the control logic 201 may cycle through four different phases, which may differ depending on whether the duty cycle is less than 50% or greater than 50%.

Operation of the adaptive SMPS circuit with a duty cycle of less than 50% is described first. In a first phase (referred to as a "charging phase"), transistors Q2 and Q4 are activated, and transistors Q3 and Q5 are deactivated, to charge the flying capacitive element Cfly and to energize the inductive element L1. In a second phase (called a "holding phase"), transistor Q2 is deactivated, and transistor Q5 is activated, such that the VSW node is coupled to the reference potential node, the flying capacitive element Cfly is disconnected (e.g., one of the Cfly terminals is floating), and the inductive element L1 is deenergized. In a third phase (referred to as a "discharging phase"), transistors Q3 and Q5 are activated, and transistor Q4 is deactivated, to discharge the flying capacitive element Cfly and to energize the inductive element L1. In a fourth phase (also referred to as a "holding phase"), transistor Q4 is activated, and transistor Q3 is deactivated, such that the flying capacitive element Cfly is disconnected and the inductive element L1 is deenergized.

Operation of the adaptive SMPS circuit with a duty cycle greater than 50% is similar in the first and third phases, with the same transistor configurations. However, in the second phase (called a "holding phase") following the first phase, transistor Q4 is deactivated, and transistor Q3 is activated, such that the VSW node is coupled to the MID node, the flying capacitive element Cfly is disconnected, and the inductive element L1 is energized. Similarly in the fourth phase (also referred to as a "holding phase") with a duty cycle greater than 50%, transistor Q2 is activated, and transistor Q5 is deactivated, such that the flying capacitive element Cfly is disconnected and the inductive element L1 is energized.

Furthermore, the control logic 201 may have a control signal (not shown in FIG. 2) configured to control operation of switch S1 and selectively enable divide-by-two (Div2) charge pump operation. For certain aspects, when this control signal is logic low, switch S1 is open, and the power supply circuit 200 operates as a three-level buck converter using the inductive element L1. When this control signal is logic high for certain aspects, switch S1 is closed, thereby shorting across the inductive element L1 and effectively removing the inductive element L1 from the circuit, such that the adaptive SMPS circuit operates as a Div2 charge pump. The control logic 201 may be configured to automatically control operation of switch S1 (e.g., through the logic level of the control signal) based on an output current (also referred to as a "load current") and/or an input current for the adaptive SMPS circuit.

Example Power Supply Circuit for Multi-Battery Charging

Many portable devices may utilize multiple independent batteries. In some cases, such as foldable and flip phones and Internet of things (IoT) devices, the multiple independent batteries include batteries of varying capacities (asymmetrical batteries) that often result in challenges for charging, monitoring, and balancing the batteries. At least some multi-battery charging implementations are complex and expensive (in terms of cost and area), and may result in performance issues. For example, some multi-battery charging implementations use multiple separate charging circuits and employ impedance-balancing circuitry (e.g., a current limit switch) to balance the batteries (e.g., prevent one battery from charging or discharging faster than another).

Certain aspects of the present disclosure provide techniques and apparatus for charging multiple independent batteries using a power supply circuit that includes a switched-mode power supply (SMPS) and independently controlled and monitored charging paths. Such a power supply circuit may control and monitor the charging of multiple independent batteries without using multiple chargers. For example, the power supply circuit may include independently controlled charging paths for each battery, each charging path having a switch (e.g., battery FET) to provide charging control. In some aspects, the power supply circuit may operate without impedance-balancing circuitry (e.g., a current limit switch). In this manner, certain aspects may support independently controlling charging, monitoring, and balancing of multiple independent batteries (e.g., any number m of cells in series per battery and any number n of batteries in parallel (mSnP), such as one cell per battery and any multiple number n of batteries in parallel (1SnP), regardless whether the batteries have different capacities), while significantly reducing cost and complexity. Such a power supply circuit may also provide for independently monitoring each battery's individual state of charge.

Figure 3A:
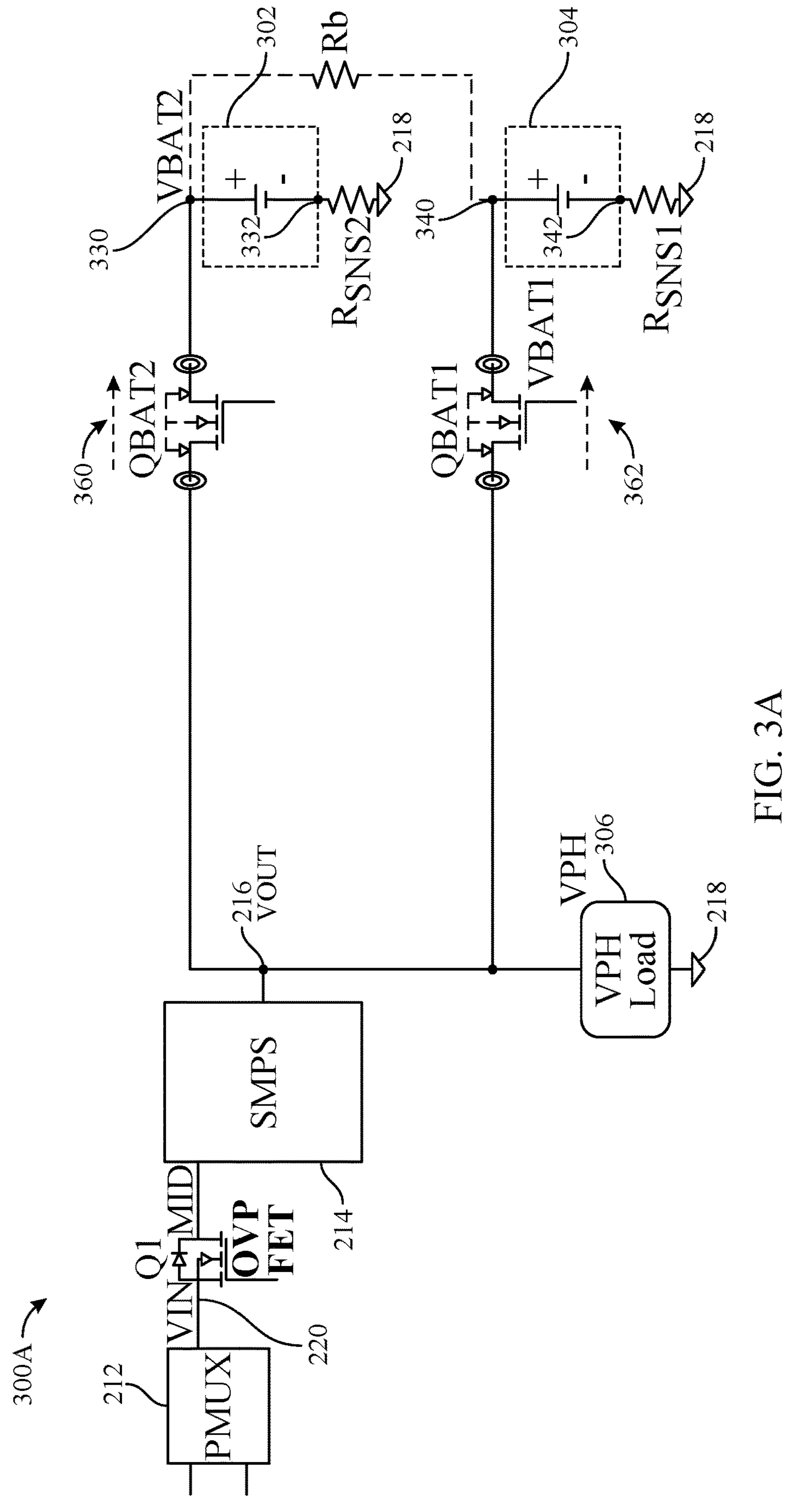
FIG. 3A is a circuit diagram of an example power supply circuit capable of single charger charging that includes a switched-mode power supply (SMPS) circuit and multiple independently controlled charging paths, in accordance with certain aspects of the present disclosure.

FIG. 3A is a circuit diagram of an example power supply circuit 300A that includes a switching regulator (e.g., the SMPS circuit 214) as a single charger and independently controlled charging paths (e.g., charging paths 360, 362), in accordance with certain aspects of the present disclosure. For certain aspects, the power supply circuit 300A may include the power multiplexer 212, the OVP FET Q1, and the SMPS circuit 214 (or another suitable SMPS circuit). The power supply circuit 300A may also include a load 306 (e.g., labeled "VPH Load"), a first switch (e.g., implemented by one or more transistors QBAT1), a second switch (e.g., implemented by one or more transistors transistor QBAT2), a first battery 304 (BAT1), a second battery 302 (BAT2), a first sense resistive element $R_{SNS1}$, a second sense resistive element $R_{SNS2}$, and a balancing resistive element Rb. For certain aspects, the batteries 302, 304 may be external to an integrated circuit (IC) (e.g., a PMIC), whereas at least a portion of the switching regulator and the switches (implemented by transistors QBAT1 and QBAT2) may be internal to the IC. The sense resistive elements $R_{SNS1}$ and $R_{SNS2}$ may be internal or external to the IC, or one sense resistive element may be internal while the other is external. For certain aspects, either or both of the sense resistive elements $R_{SNS1}$ and $R_{SNS2}$ may be eliminated, and the on-resistance(s) of the corresponding transistors QBAT1 and/or QBAT2 may be used as current-sensing resistor(s).

The load 306 may be analogous to the load 210 of FIG. 2. The load 306 may represent one or more circuits of a device (e.g., the device 100 of FIG. 1) that are powered internally by the switching regulator (e.g., with power supply rail VPH=VOUT). The load 306 may be coupled (in shunt) to the reference potential node 218.

In certain aspects, the first battery 304 and/or the second battery 302 may represent a single-cell (1S) battery, a two-cell-in-series (2S) battery, or more than two stacked cells in a battery (e.g., a multi-cell-in series battery). The charging architecture illustrated in FIG. 3A represents a 1S2P configuration. In some cases, the first battery 304 and the second battery 302 may be symmetrical batteries, having the same capacity (and size). In other cases, the first battery 304 and the second battery 302 may be asymmetrical batteries, each with a different capacity (and size). For example, the power supply circuit 300A may be included in a device that is foldable, which may include a first portion coupled to a second portion by a hinge. In this example, the first portion of the foldable device may include the first battery 304, and the second portion of the foldable device may include the second battery 302.

In certain aspects, the output voltage node 216 of the SMPS circuit 214 may be coupled to transistor(s) QBAT1, transistor(s) QBAT2, and the load 306. In certain aspects, one or more of transistors QBAT1 and QBAT2 may be bidirectional switches, each implemented with one or more transistors. In some cases, transistor(s) QBAT1 and/or QBAT2 may be implemented by back-to-back transistors or a body-switchable transistor, for example. The gates of the QBAT1 and QBAT2 transistors may be driven by logic circuitry (e.g., the control logic 201 of FIG. 2 or other logic not shown in FIG. 3A).

In certain aspects, transistor(s) QBAT1 may be coupled to the first battery 304 via a first battery voltage node 340 (labeled "VBAT1"), and transistor(s) QBAT2 may be coupled to the second battery 302 via a second battery voltage node 330 (labeled "VBAT2"). The first battery 304 may be coupled to the first sense resistive element $R_{SNS1}$ via another first battery voltage node 342 (e.g., coupled to the negative terminal of the first battery 304), and the second battery 302 may be coupled to the second sense resistive element $R_{SNS2}$ via another second battery voltage node 332 (e.g., coupled to the negative terminal of the second battery 302). The first and second sense resistive elements $R_{SNS1}$ and $R_{SNS2}$ may function as sensing resistors to measure the current through the first battery 304 and the second battery 302, respectively.

When the batteries 302, 304 are external to an IC with other circuitry of the power supply circuit 300A, the IC may include a positive first battery port (e.g., a pin) coupled to the first battery voltage node 340 and to the positive terminal of the first battery 304. In some cases, the IC may include a negative first battery port coupled to the other first battery voltage node 342, to the first sense resistive element $R_{SNS1}$, and to the negative terminal of the first battery 304. Additionally or alternatively, the IC may include a positive second battery port coupled to the second battery voltage node 330 and to the positive terminal of the second battery 302. In some cases, the IC may include a negative second battery port coupled to the other second battery voltage node 332, to the sense resistive element $R_{SNS2}$, and to the negative terminal of the second battery 302. The sense resistive elements $R_{SNS1}$ and $R_{SNS2}$ may be coupled to the reference potential node 218.

In certain aspects, the positive terminals of the first battery 304 and the second battery 302 may be coupled together via the balancing resistive element Rb. In some cases, the balancing resistive element Rb may be implemented as a 100Ω resistor, for example. The balancing resistive element Rb may be internal to the IC (coupled between the first battery voltage node 340 and the second battery voltage node 330) or may be external to the IC. The balancing resistive element Rb may be used to balance the two batteries during charging or when the device is powered off and the batteries 302, 304 begin discharging.

According to certain aspects, the power supply circuit 300A may perform charging (via the SMPS circuit 214) of both the first battery 304 and the second battery 302 through two independently controlled charging paths 360, 362. Electrical power received from a wall adapter or wireless charger, for example, at the power multiplexer 212 may be converted by the SMPS circuit 214 and used to independently charge the first battery 304 (e.g., through charging path 362) and the second battery 302 (e.g., charging path 360). For example, current from the output voltage node 216 may be routed to the first battery voltage node 340 via transistor(s) QBAT1 in the charging path 362, for charging the first battery 304. Similarly, current from the output voltage node 216 may be routed to the second battery voltage node 330 via transistor(s) QBAT2 in the charging path 360, for charging the second battery 302. In certain aspects, transistor(s) QBAT1 may be configured to independently control and monitor charging of the first battery 304 (via charging path 362), and transistor(s) QBAT2 may be configured to independently control and monitor charging of the second battery 302 (via charging path 360).

Having one or more transistors (e.g., transistor(s) QBAT1 or QBAT2) in each charging path may allow for independent charging control for the batteries, including trickle, precharge, constant current (CC), constant voltage (CV), and/or termination charging. In certain aspects, independently monitoring the charging of the multiple independent batteries may include independently monitoring the level of charge in the batteries via these transistors. Additionally or alternatively, independently monitoring the charging of the multiple independent batteries may include independent current sensing, battery measurement, and/or current limit regulation (total or individual) for the batteries. The presence of one or more transistors in each charging path may eliminate the use of impedance-balancing circuitry (e.g., a current limit switch) between the multiple independent batteries, because the transistor(s) in each charging path may be used to perform current limit regulation. For example, the power supply circuit 300A may lack a current limit switch between the first battery 304 and the second battery 302.

Certain aspects of the present disclosure may also provide flexibility in the end of charge for the batteries (e.g., battery end of charge may be dependent on current for a single battery, the total current for multiple batteries, or the battery state of charge (SOC)). The independent charging path switches (e.g., transistors QBAT1 and QBAT2) may be internal (integrated in the PMIC), or one or more of the switches may be external to the PMIC. The temperature of the batteries can be independently monitored and, based on the sensed battery temperature(s), appropriate action may be taken (e.g., charging may be suspended, charging voltage and/or current may be reduced, etc.) via the independent charging path switches. For example, when the temperature of the second battery 302 is too high, transistor(s) QBAT2 may be effectively opened, or the charging current may be reduced in increments.

According to certain aspects, the power supply circuit 300A may perform charging of a single battery (e.g., the first battery 304) using a single charger. For example, the second battery 302 may have been disconnected and/or removed from the power supply circuit 300A. In this 1S1P configuration, transistor(s) QBAT2 may be used as a bypass switch (e.g., a bypass FET). The power supply circuit 300A may enable power-on for a device (e.g., device 100) when only a single battery is connected, and may also prevent overcharging of the single connected battery.

In some cases, it may be desirable to utilize parallel charging to charge multiple independent batteries to speed up charging (e.g., when the batteries have greater power levels). In one example parallel charging solution, a main charger (e.g., the SMPS circuit 214) is capable of charging multiple independent batteries (e.g., the first battery 304 and the second battery 302) and providing power by itself or may be paralleled with one or more auxiliary chargers. Each of the auxiliary chargers may be implemented, for example, as a switched-capacitor converter (e.g., a divide-by-two (Div2) or a divide-by-three (Div3) charge pump (CP)) or a switched-mode power supply (SMPS) topology using an inductor (e.g., a buck converter). CP converters may provide a more efficient alternative than buck converters.

FIGS. 3B-3E are circuit diagrams of example power supply circuits capable of parallel charging that include a main charger (e.g., the SMPS circuit 214) and one or more auxiliary chargers, with multiple independently controlled charging paths (e.g., charging paths 360, 362), in accordance with certain aspects of the present disclosure.

Figure 3B:
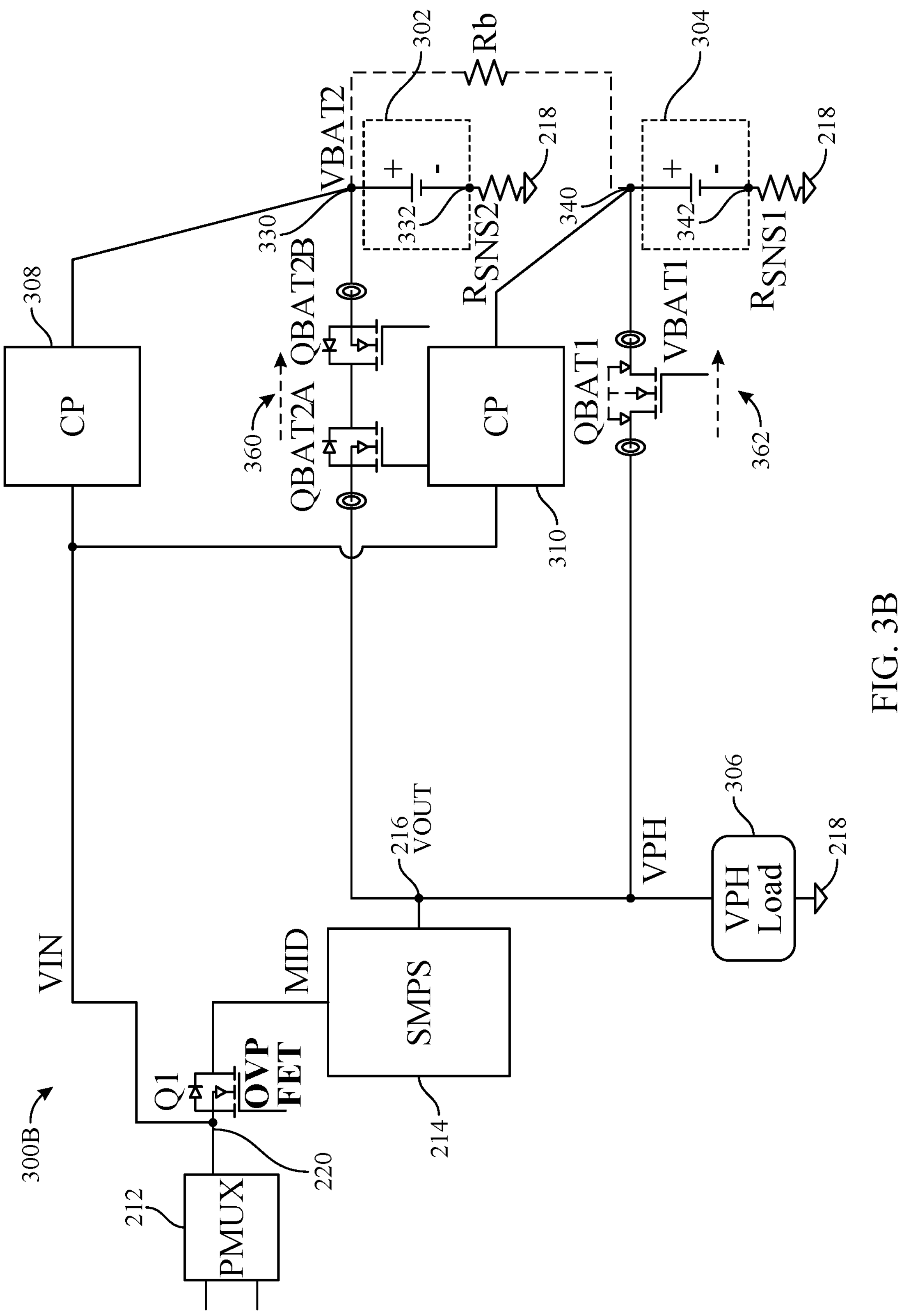
FIGS. 3B-3E are circuit diagrams of example power supply circuits capable of parallel charging that include an SMPS circuit and multiple independently controlled charging paths, in accordance with certain aspects of the present disclosure.

The power supply circuit 300B of FIG. 3B may be similar to the power supply circuit 300A of FIG. 3A, but also includes a CP 308 and a CP 310 as the auxiliary chargers for parallel charging. Each of the CPs 308, 310 may be implemented as a Div2 charge pump, a divide-by-four (Div4) charge pump, or a charge pump with any other suitable voltage conversion. CP 308 may have an input coupled to the input voltage node 220 and an output coupled to the second battery voltage node 330, and CP 310 may have an input coupled to the input voltage node 220 and an output coupled to the first battery voltage node 340. The design of the power supply circuit 300B may be desirable when the first battery 304 and the second battery 302 are substantially symmetric (e.g., less asymmetric), due to lower amounts of power conduction loss.

As described above, transistor(s) QBAT2 may be implemented as back-to-back transistors QBAT2A and QBAT2B, as shown, but may alternatively be implemented as a body-switchable transistor. The gates of transistors QBAT2A and QBAT2B may be driven by logic circuitry, as described above.

During parallel charging, electrical power received from a wall adapter or wireless charger, for example, at the power multiplexer 212 may be converted by the SMPS circuit 214 and used to independently charge the first battery 304 (e.g., through charging path 362) and the second battery 302 (e.g., charging path 360). In addition to charging path 362, electrical power from the power multiplexer 212 may also be converted by CP 310 and used to charge the first battery 304 in parallel with the SMPS circuit 214, when CP 310 is enabled. Further, in addition to charging path 360, electrical power from the power multiplexer 212 may also be converted by CP 308 and used to charge the second battery 302 in parallel with the SMPS circuit 214, when CP 308 is enabled.

Figure 3C:
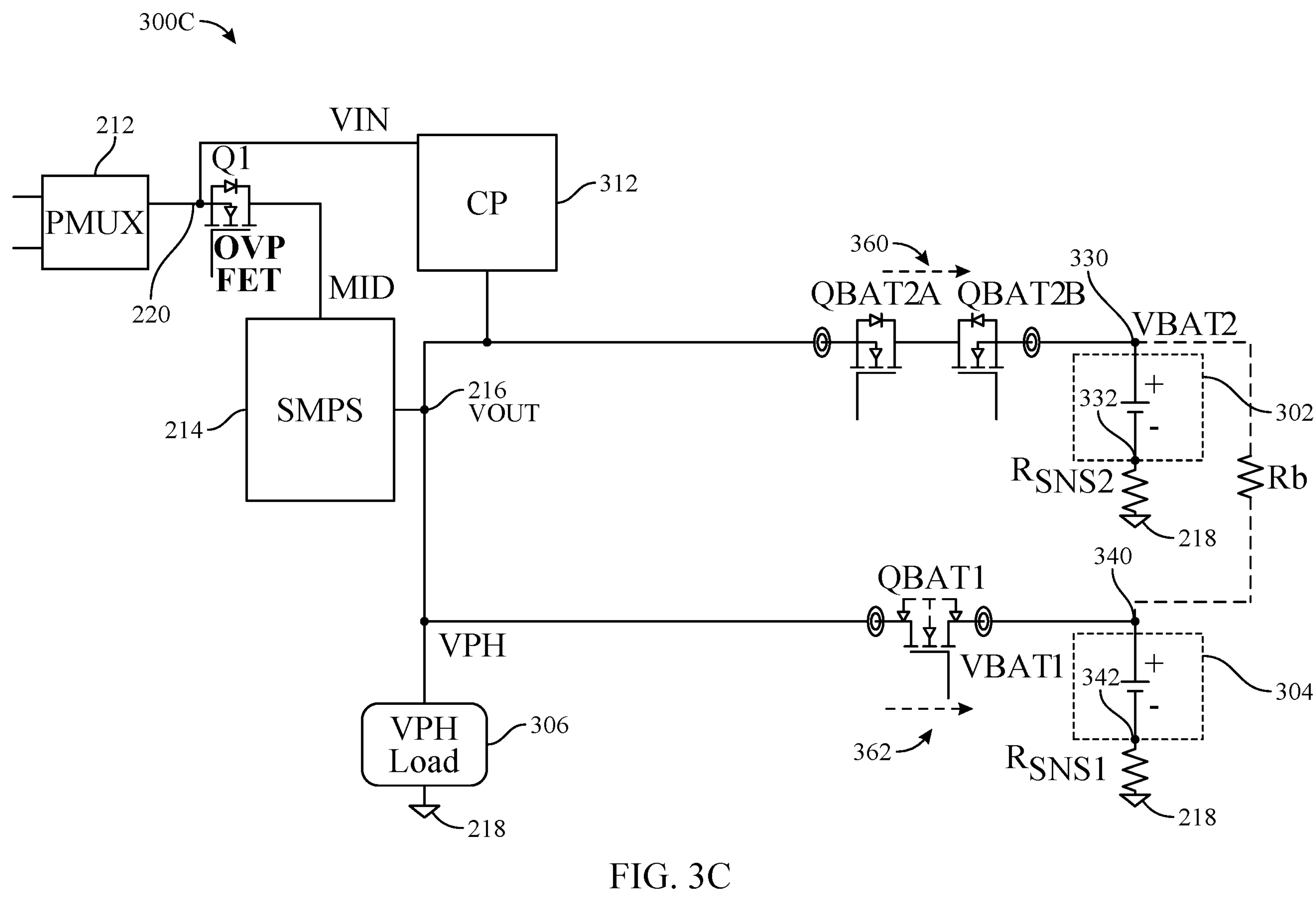

The power supply circuit 300C of FIG. 3C may be similar to the power supply circuit 300A of FIG. 3A, with the addition of a CP 312 as an auxiliary charger for parallel charging. The CP 312 may be implemented as a Div2 charge pump, a Div4 charge pump, or a charge pump with any other suitable voltage conversion. The CP 312 may have an input coupled to the input voltage node 220 and an output coupled to the output voltage node 216.

The sense resistive elements (e.g., elements $R_{SNS1}$ and $R_{SNS2}$) are optional in the power supply circuit 300C, and may be removed from the power supply circuit 300C. In cases where the power supply circuit 300C does not include elements $R_{SNS1}$ and $R_{SNS2}$, the on-resistance of transistor(s) QBAT1 may function as a sensing resistor for the first battery 304, and the on-resistance of transistor(s) QBAT2 may function as a sensing resistor for the second battery 302. In addition, due to the design of having a single charge pump and how CP 312 is connected, the power supply circuit 300C may also have fewer wires or traces crossing the hinges of a foldable device (compared to the other parallel charging topologies in the power supply circuits 300B, 300D of FIGS. 3B and 3D).

As described above, transistor(s) QBAT2 may be implemented as back-to-back transistors QBAT2A and QBAT2B, as shown in FIG. 3C, but may alternatively be implemented as a body-switchable transistor. The gates of transistors QBAT2A and QBAT2B may be driven by logic circuitry, as described above.

During parallel charging, electrical power received from a wall adapter or wireless charger, for example, at the power multiplexer 212 may be converted by the SMPS circuit 214 and used to independently charge the first battery 304 (e.g., through charging path 362) and the second battery 302 (e.g., charging path 360). In addition, when the CP 312 is enabled, electrical power from the power multiplexer 212 may also be converted by the CP 312 and used to independently charge the first battery 304 (e.g., through charging path 362) and the second battery 302 (e.g., through charging path 360).

Figure 3D:
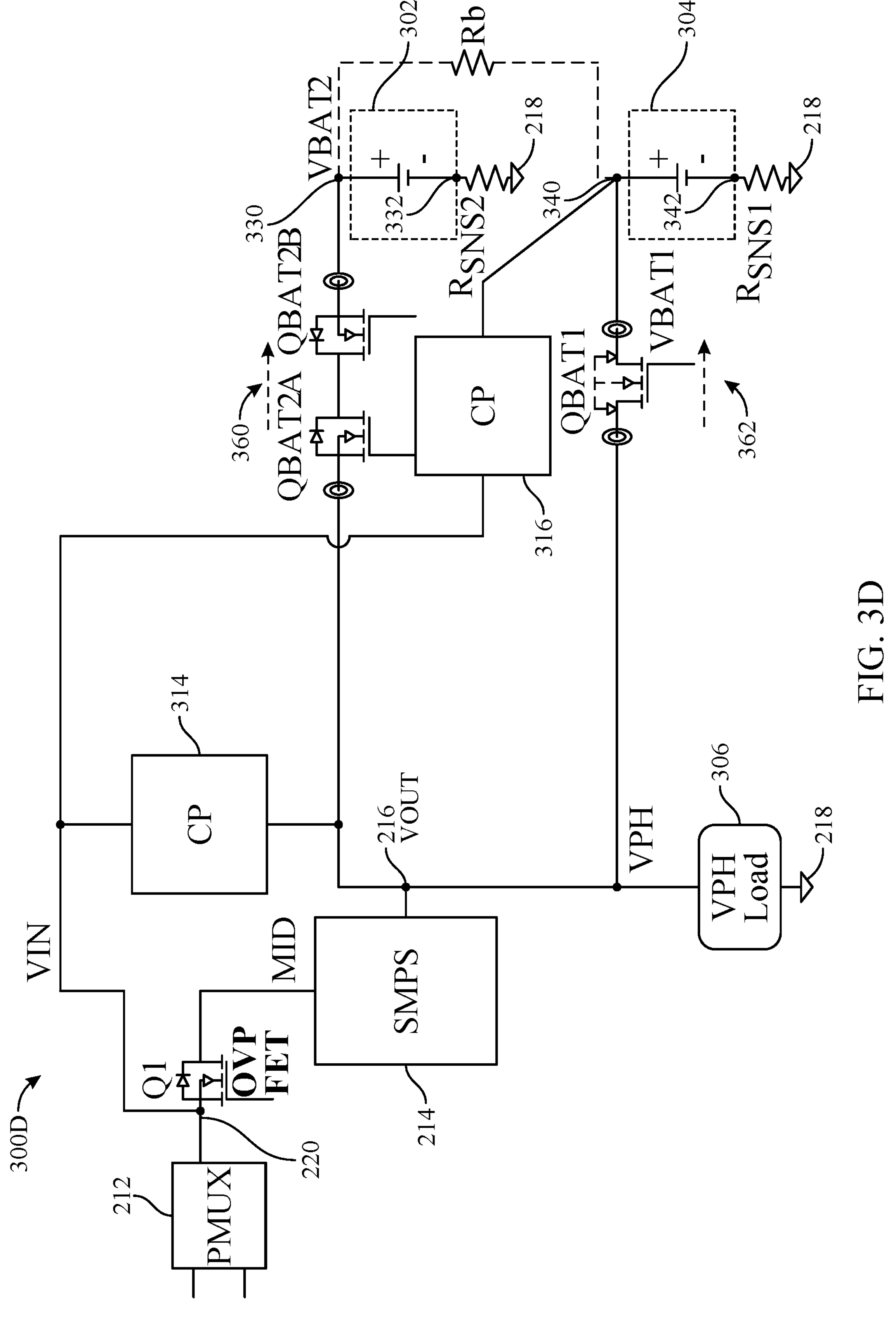

The power supply circuit 300D of FIG. 3D may be similar to the power supply circuit 300A of FIG. 3A, but may also include a CP 314 and a CP 316 as the auxiliary chargers for parallel charging. Each of the CPs 314, 316 may be implemented as a Div2 charge pump, a Div4 charge pump, or a charge pump with any other suitable voltage conversion. CP 314 may have an input coupled to the input voltage node 220 and an output coupled to the output voltage node 216, and CP 316 may have an input coupled to the input voltage node 220 and an output coupled to the first battery voltage node 340. The design of the power supply circuit 300D may be desirable when the first battery 304 and the second battery 302 are very asymmetric (compared to the power supply circuits 300A, 300B of FIGS. 3A and 3B). For example, the first battery 304 may have a much larger capacity than the second battery 302 and may benefit from being charged by both CP 314 and CP 316, in addition to the SMPS circuit 214. The power supply circuit 300D may have lower conduction power loss and higher efficiency than the power supply circuit 300C of FIG. 3C.

In certain aspects, the power supply circuit 300D may not include sense resistive element $R_{SNS2}$. Instead, the on-resistance(s) of transistors QBAT2A and/or QBAT2B may function as a current-sensing resistor for the second battery 302.

During parallel charging, electrical power received from a wall adapter or wireless charger, for example, at the power multiplexer 212 may be converted by the SMPS circuit 214 and used to independently charge the first battery 304 (e.g., through charging path 362) and the second battery 302 (e.g., charging path 360). In addition, when CP 314 is enabled, electrical power from the power multiplexer 212 may also be converted by CP 314 and used to independently charge the first battery 304 (e.g., through charging path 362) and the second battery 302 (e.g., through charging path 360). Further, electrical power from the power multiplexer 212 may be converted by CP 316 and used to charge the first battery 304 in parallel with the SMPS circuit 214, when CP 316 is enabled, (and in parallel with CP 314 when both CPs 314, 316 are enabled).

Figure 3E:
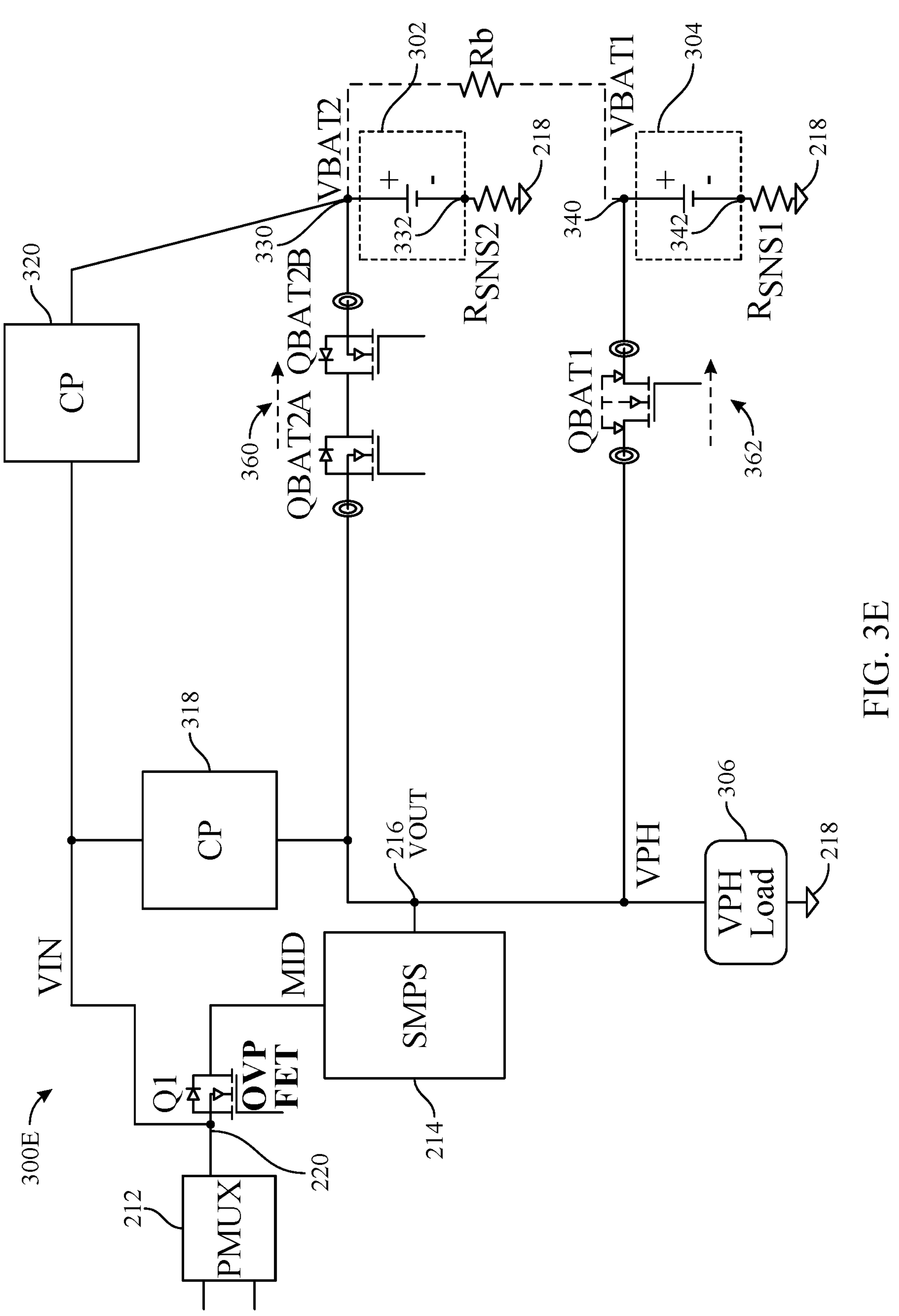

The power supply circuit 300E of FIG. 3E may be similar to the power supply circuit 300A of FIG. 3A, but may also include a CP 318 and a CP 320 as the auxiliary chargers for parallel charging. Each of the CPs 318, 320 may be implemented as a Div2 charge pump, a Div4 charge pump, or a charge pump with any other suitable voltage conversion. CP 318 may have an input coupled to the input voltage node 220 and an output coupled to the output voltage node 216, and CP 320 may have an input coupled to the input voltage node 220 and an output coupled to the second battery voltage node 330. The design of the power supply circuit 300E may be desirable when the first battery 304 and the second battery 302 are very asymmetric (compared to the power supply circuit 300A, 300B of FIGS. 3A and 3B). For example, the second battery 302 may have a much larger capacity than the first battery 304 and, thus, may benefit from being charged by both CP 318 and CP 320, in addition to the SMPS circuit 214. The power supply circuit 300E may have lower conduction power loss and higher efficiency than the power supply circuit 300C of FIG. 3C.

In certain aspects, the power supply circuit 300E may not include sense resistive element $R_{SNS1}$. Instead, the on-resistance(s) of transistor(s) QBAT1 may function as a current-sensing resistor for the first battery 304.

During parallel charging, electrical power received from a wall adapter or wireless charger, for example, at the power multiplexer 212 may be converted by the SMPS circuit 214 and used to independently charge the first battery 304 (e.g., through charging path 362) and the second battery 302 (e.g., charging path 360), as described above. In addition, when CP 318 is enabled, electrical power from the power multiplexer 212 may also be converted by CP 318 and used to independently charge the first battery 304 (e.g., through charging path 362) and the second battery 302 (e.g., through charging path 360). Further, electrical power from the power multiplexer 212 may be converted by CP 320 and used to charge the second battery 302 in parallel with the SMPS circuit 214, when CP 320 is enabled, (and in parallel with CP 318 when both CPs 318, 320 are enabled).

Figure 3F:
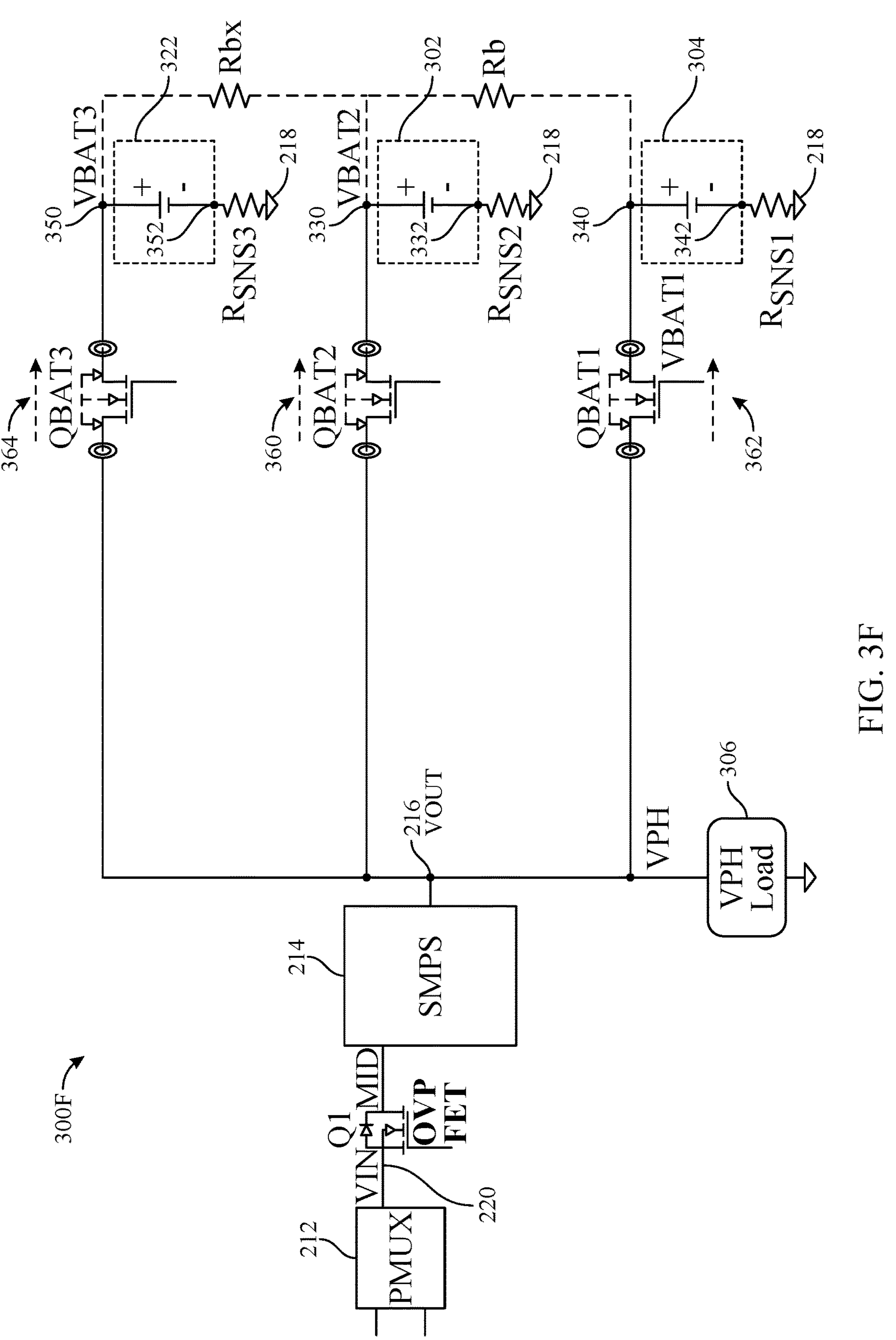
FIG. 3F is a circuit diagram of an example power supply circuit capable of charging more than two independent batteries that includes an SMPS circuit and more than two independently controlled charging paths, in accordance with certain aspects of the present disclosure.

FIG. 3F is a circuit diagram of an example power supply circuit (e.g., power supply circuit 300F) capable of charging more than two independent batteries, in accordance with certain aspects of the present disclosure. The power supply circuit includes an SMPS circuit (e.g., the SMPS circuit 214) and multiple independent charging paths (e.g., charging paths 360, 362, 364). In some cases, it may be desirable for a device to have more than two batteries coupled in parallel. The power supply circuit 300F of FIG. 3F may be similar to the power supply circuit 300A of FIG. 3A, but may also include a third switch (implemented by one or more transistors QBAT3) for independently controlling charging of a third battery 322, a third sense resistive element $R_{SNS3}$, and a second balancing resistive element Rbx. In certain aspects, transistor(s) QBAT3 may be a bidirectional switch implemented with transistors. For example, transistor(s) QBAT3 may be implemented by back-to-back transistors or a body-switchable transistor. The gate of transistor(s) QBAT3 transistor may be driven by logic circuitry (e.g., the control logic 201 of FIG. 2 or other logic not shown in FIG. 3F), as described above.

In this case, the output voltage node 216 of the SMPS circuit 214 may also be coupled to transistor(s) QBAT3. Transistor(s) QBAT3 may be coupled to (a port for coupling to) a positive terminal of the third battery 322 via a third battery voltage node 350 (labeled "VBAT3"). A negative terminal of the third battery 322 (or a port therefor) may be coupled to the third sense resistive element $R_{SNS3}$ via another third battery voltage node 352. The third sense resistive element $R_{SNS3}$ may be configured to measure the current through the third battery 322 and may be coupled to the reference potential node 218, as shown. The third sense resistive element $R_{SNS3}$ may be internal to an integrated circuit (IC) (e.g., a PMIC) with at least a portion of the power supply circuit 300F, or external to such an IC. For example, the IC may include a port coupled to the third battery voltage node 350 for coupling to the positive terminal of the $3^{rd}$ battery. In some cases, the IC may include another port, which may be coupled to the other third battery voltage node 352 for coupling to the negative terminal of the third battery 322, or which may be coupled to the reference potential node 218 for coupling to an external third sense resistive element $R_{SNS3}$. In certain aspects, the third battery 322 and the second battery 302 may be coupled together via the second balancing resistive element Rbx. In some cases, the second balancing resistive element Rb may be implemented as a 100Ω resistor, for example. In certain aspects, a third balancing resistive element (not shown) may be added between the first battery voltage node 340 and the third battery voltage node 350. The third sense resistive element $R_{SNS3}$, the second balancing resistive element Rbx, and/or the third balancing resistive element may be external or internal to the IC (e.g., the PMIC).

According to certain aspects, the power supply circuit 300F may perform charging of the third battery 322 (using a single charger) in addition to the first battery 304 and the second battery 302 via three independently controlled charging paths. Charging paths 360, 362 are described above with respect to FIG. 3A. Electrical power converted by the SMPS circuit 214 may also be used to charge the third battery 322 (e.g., via charging path 364). For example, current from the SMPS circuit 214 may be routed from the output voltage node 216 to the third battery voltage node 350 via transistor(s) QBAT3. In certain aspects, transistor(s) QBAT3 may be configured to independently control and monitor charging of the third battery 322 (via charging path 364), as described above (e.g., with respect to FIG. 3A).

EXAMPLE OPERATIONS

Figure 4:
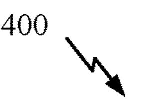
FIG. 4 is a flow diagram of example operations for supplying power, in accordance with certain aspects of the present disclosure.
Figure 4:
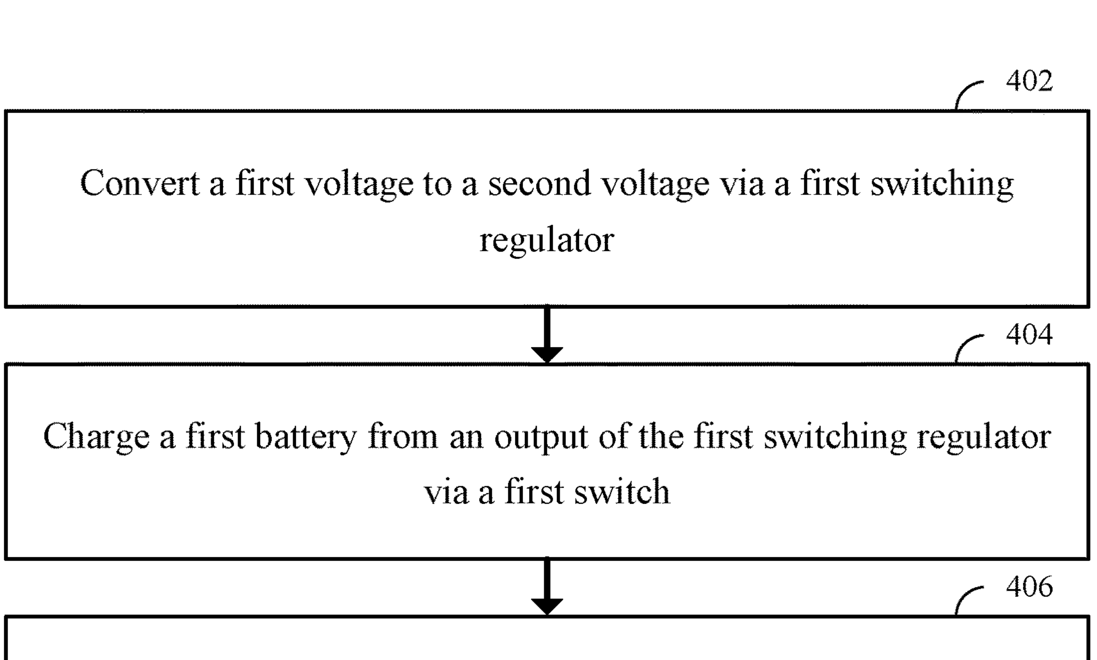

FIG. 4 is a flow diagram of example operations 400 for supplying power, in accordance with certain aspects of the present disclosure. The operations 400 may be performed by a power supply circuit (e.g., the power supply circuits 300A-300F of FIGS. 3A-3F).

The operations may begin, at block 402, with a first switching regulator (e.g., the SMPS circuit 214) converting a first voltage (e.g., input voltage VIN or MID) to a second voltage (output voltage VOUT or VPH). At block 404, the power supply circuit charges a first battery (e.g., first battery 304) from an output (e.g., output voltage node 216) of the first switching regulator via a first switch (e.g., transistor(s) QBAT1). At block 406, the power supply circuit charges a second battery (e.g., second battery 302) from the output of the first switching regulator via a second switch (e.g., transistor(s) QBAT2). The second switch is different from the first switch.

According to certain aspects, the operations 400 further include charging a third battery (e.g., third battery 322) from the output of the first switching regulator via a third switch (e.g., transistor(s) QBAT3). In this case, the third switch may be different from the second switch and/or different from the first switch.

According to certain aspects, the operations 400 further involve converting the first voltage to the second voltage via a second switching regulator (e.g., CP 312, 314, or 318). In this case, the output of the first switching regulator may be coupled to an output of the second switching regulator. For certain aspects, the operations 400 further involve converting the first voltage to a third voltage via a third switching regulator (e.g., CP 316 or 320). In some cases, the operations 400 may further include charging the first battery from an output of the third switching regulator (e.g., as described above with respect to FIG. 3D). Such charging of the first battery from the output of the third switching regulator may occur while charging the first battery from the output of the first switching regulator via the first switch at block 404. In other cases, the operations 400 may further include charging the second battery from an output of the third switching regulator (e.g., as described above with respect to FIG. 3E). Such charging of the second battery from the output of the third switching regulator may occur while charging the second battery from the output of the first switching regulator via the second switch at block 406.

According to certain aspects, the operations 400 further involve converting the first voltage to a third voltage via a second switching regulator (e.g., CP 310) and charging the first battery from an output of the second switching regulator. Such charging of the first battery from the output of the second switching regulator may occur while charging the first battery from the output of the first switching regulator via the first switch. For certain aspects, the operations 400 may further include converting the first voltage to a fourth voltage via a third switching regulator (e.g., CP 308) and charging the second battery from an output of the third switching regulator. Such charging of the second battery from the output of the third switching regulator may occur while charging the second battery from the output of the first switching regulator via the second switch.

Example Aspects

In addition to the various aspects described above, specific combinations of aspects are within the scope of the disclosure, some of which are detailed below:

Aspect 1: A power supply circuit comprising: a switching regulator including an output node; a first battery node for coupling to a first battery; a second battery node for coupling to a second battery; a first switch coupled between the output node of the switching regulator and the first battery node; and a second switch coupled between the output node of the switching regulator and the second battery node.

Aspect 2: The power supply circuit of Aspect 1, wherein the first switch and the second switch are bidirectional switches implemented with transistors.

Aspect 3: The power supply circuit of Aspect 1 or 2, wherein at least one of the first switch or the second switch comprises back-to-back transistors.

Aspect 4: The power supply circuit of any of Aspects 1 to 3, wherein at least one of the first switch or the second switch comprises a body-switchable transistor.

Aspect 5: The power supply circuit of any of Aspects 1 to 4, further comprising a first sense resistive element for coupling to the first battery.

Aspect 6: The power supply circuit of Aspect 5, further comprising: a reference potential node for the power supply circuit; and a third battery node, wherein the first battery node is for coupling to a first terminal of the first battery, wherein the third battery node is for coupling to a second terminal of the first battery, and wherein the first sense resistive element is coupled between the third battery node and the reference potential node.

Aspect 7: The power supply circuit of Aspect 5 or 6, further comprising a second sense resistive element for coupling to the second battery.

Aspect 8: The power supply circuit of Aspect 7, further comprising: a reference potential node for the power supply circuit; a third battery node, wherein the first battery node is for coupling to a first terminal of the first battery, wherein the third battery node is for coupling to a second terminal of the first battery, and wherein the first sense resistive element is coupled between the third battery node and the reference potential node; and a fourth battery node, wherein the second battery node is for coupling to a first terminal of the second battery, wherein the fourth battery node is for coupling to a second terminal of the second battery, and wherein the second sense resistive element is coupled between the fourth battery node and the reference potential node.

Aspect 9: The power supply circuit of any of Aspects 1 to 8, further comprising a resistive element coupled between the first battery node and the second battery node.

Aspect 10: The power supply circuit of any of Aspects 1 to 9, wherein the power supply circuit lacks a current limit switch coupled between the first battery node and the second battery node.

Aspect 11: The power supply circuit of any of Aspects 1 to 10, further comprising a first charge pump including a first terminal coupled to an input node of the switching regulator and a second terminal coupled to the output node of the switching regulator.

Aspect 12: The power supply circuit of Aspect 11, further comprising a second charge pump including a first terminal coupled to the input node of the switching regulator and a second terminal coupled to the first battery port.

Aspect 13: The power supply circuit of Aspect 11, further comprising a second charge pump including a first terminal coupled to the input node of the switching regulator and a second terminal coupled to the second battery port.

Aspect 14: The power supply circuit of any of Aspects 1 to 10, further comprising a first charge pump including a first terminal coupled to an input node of the switching regulator and a second terminal coupled to the first battery port.

Aspect 15: The power supply circuit of Aspect 14, further comprising a second charge pump including a first terminal coupled to the input node of the switching regulator and a second terminal coupled to the second battery port.

Aspect 16: The power supply circuit of any of Aspects 1 to 15, wherein the switching regulator comprises a three-level buck converter selectively configurable as a divide-by-two charge pump.

Aspect 17: The power supply circuit of Aspect 16, wherein: the three-level buck converter comprises an inductive element coupled to the output node of the switching regulator and a switch coupled in parallel with the inductive element; the three-level buck converter is configured to operate in a buck converter mode when the switch is open; and the three-level buck converter is configured to operate in a charge pump mode when the switch is closed.

Aspect 18. The power supply circuit of any of Aspects 1 to 15, wherein the switching regulator comprises a two-level buck converter.

Aspect 19: An integrated circuit (IC) for power management, the IC comprising the power supply circuit of any of Aspects 1 to 18.

Aspect 20: The IC of Aspect 19, further comprising: a first port coupled to the first battery node, the first port configured for coupling to the first battery; and a second port coupled to the second battery node, the second port configured for coupling to the second battery.

Aspect 21: The IC of Aspect 19 or 20, wherein the first switch and the second switch are internal to the IC.

Aspect 22: A device comprising: a switching regulator including an output node; a first battery; a second battery; a first switch coupled between the output node of the switching regulator and the first battery; and a second switch coupled between the output node of the switching regulator and the second battery.

Aspect 23: The device of Aspect 22, wherein the device is foldable, wherein a first portion of the device is coupled to a second portion of the device by a hinge, wherein the first battery is disposed in the first portion, and wherein the second battery is disposed in the second portion.

Aspect 24: The device of Aspect 22 or 23, further comprising a resistive element coupled between the first battery and the second battery.

Aspect 25: The device of Aspect 24, wherein at least a portion of the switching regulator, the first switch, and the second switch are implemented in an integrated circuit (IC) and wherein the resistive element is external to the IC.

Aspect 26: The device of any of Aspects 22 to 25, wherein a capacity of the first battery differs from a capacity of the second battery.

Aspect 27: The device of any of Aspects 22 to 26, wherein the second switch is configured for charging control of the second battery, independent from charging control of the first battery by the first switch.

Aspect 28: A method of supplying power, comprising: converting a first voltage to a second voltage via a first switching regulator; charging a first battery from an output of the first switching regulator via a first switch; and charging a second battery from the output of the first switching regulator via a second switch, the second switch being different from the first switch.

Aspect 29: The method of Aspect 28, further comprising charging a third battery from the output of the first switching regulator via a third switch, the third switch being different from the second switch and the first switch.

Aspect 30: The method of Aspect 28 or 29, further comprising converting the first voltage to the second voltage via a second switching regulator, wherein the output of the first switching regulator is coupled to an output of the second switching regulator.

Aspect 31: The method of Aspect 30, further comprising: converting the first voltage to a third voltage via a third switching regulator; and charging the first battery from an output of the third switching regulator, while charging the first battery from the output of the first switching regulator via the first switch.

Aspect 32: The method of Aspect 30, further comprising: converting the first voltage to a third voltage via a third switching regulator; and charging the second battery from an output of the third switching regulator, while charging the second battery from the output of the first switching regulator via the second switch.

Aspect 33: The method of Aspect 28 or 29, further comprising: converting the first voltage to a third voltage via a second switching regulator; and charging the first battery from an output of the second switching regulator, while charging the first battery from the output of the first switching regulator via the first switch.

Aspect 34: The method of Aspect 33, further comprising: converting the first voltage to a fourth voltage via a third switching regulator; and charging the second battery from an output of the third switching regulator, while charging the second battery from the output of the first switching regulator via the second switch.

Additional Considerations

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A power supply circuit comprising:

a switching regulator including an output node;

a first charge pump including a first terminal coupled to an input node of the switching regulator and a second terminal coupled to the output node of the switching regulator;

a first battery node for coupling to a first battery;

a second battery node for coupling to a second battery;

a first switch coupled between the output node of the switching regulator and the first battery node, the first switch being further coupled between the second terminal of the first charge pump and the first battery node; and a second switch coupled between the output node of the switching regulator and the second battery node, the second switch being further coupled between the second terminal of the first charge pump and the second battery node.

2. The power supply circuit of claim 1, wherein the first switch and the second switch are bidirectional switches implemented with transistors.

3. The power supply circuit of claim 1, wherein at least one of the first switch or the second switch comprises back-to-back transistors.

4. The power supply circuit of claim 1, wherein at least one of the first switch or the second switch comprises a body-switchable transistor.

5. The power supply circuit of claim 1, further comprising a first sense resistive element for coupling to the first battery.

6. The power supply circuit of claim 5, further comprising:

a reference potential node for the power supply circuit; and a third battery node, wherein the first battery node is for coupling to a first terminal of the first battery, wherein the third battery node is for coupling to a second terminal of the first battery, and wherein the first sense resistive element is coupled between the third battery node and the reference potential node.

7. The power supply circuit of claim 5, further comprising a second sense resistive element for coupling to the second battery.

8. The power supply circuit of claim 7, further comprising:

a reference potential node for the power supply circuit;

a third battery node, wherein the first battery node is for coupling to a first terminal of the first battery, wherein the third battery node is for coupling to a second terminal of the first battery, and wherein the first sense resistive element is coupled between the third battery node and the reference potential node; and a fourth battery node, wherein the second battery node is for coupling to a first terminal of the second battery, wherein the fourth battery node is for coupling to a second terminal of the second battery, and wherein the second sense resistive element is coupled between the fourth battery node and the reference potential node.

9. The power supply circuit of claim 1, further comprising a resistive element coupled between the first battery node and the second battery node.

10. The power supply circuit of claim 1, wherein the power supply circuit lacks a current limit switch coupled between the first battery node and the second battery node.

11. The power supply circuit of claim 1, further comprising a second charge pump including a first terminal coupled to the input node of the switching regulator and a second terminal coupled to the first battery node.

12. The power supply circuit of claim 1, further comprising a second charge pump including a first terminal coupled to the input node of the switching regulator and a second terminal coupled to the second battery node.

13. The power supply circuit of claim 1, wherein the switching regulator comprises a three-level buck converter selectively configurable as a divide-by-two charge pump.

14. The power supply circuit of claim 13, wherein:

the three-level buck converter comprises an inductive element coupled to the output node of the switching regulator and a switch coupled in parallel with the inductive element;

the three-level buck converter is configured to operate in a buck converter mode when the switch is open; and the three-level buck converter is configured to operate in a charge pump mode when the switch is closed.

15. The power supply circuit of claim 1, wherein the switching regulator comprises a two-level buck converter.

16. An integrated circuit (IC) for power management, the IC comprising the power supply circuit of claim 1.

17. The IC of claim 16, further comprising:

a first port coupled to the first battery node, the first port configured for coupling to the first battery; and a second port coupled to the second battery node, the second port configured for coupling to the second battery.

18. The IC of claim 16, wherein the first switch and the second switch are internal to the IC.

19. A device comprising:

a switching regulator including an output node;

a first charge pump including a first terminal coupled to an input node of the switching regulator and a second terminal coupled to the output node of the switching regulator;

a first battery;

a second battery;

a first switch coupled between the output node of the switching regulator and the first battery, the first switch being further coupled between the second terminal of the first charge pump and the first battery; and a second switch coupled between the output node of the switching regulator and the second battery, the second switch being further coupled between the second terminal of the first charge pump and the second battery.

20. The device of claim 19, wherein the device is foldable, wherein a first portion of the device is coupled to a second portion of the device by a hinge, wherein the first battery is disposed in the first portion, and wherein the second battery is disposed in the second portion.

21. The device of claim 19, further comprising a resistive element coupled between the first battery and the second battery.

22. The device of claim 21, wherein at least a portion of the switching regulator, the first switch, and the second switch are implemented in an integrated circuit (IC) and wherein the resistive element is external to the IC.

23. The device of claim 19, wherein a capacity of the first battery differs from a capacity of the second battery.

24. The device of claim 19, wherein the second switch is configured for charging control of the second battery, independent from charging control of the first battery by the first switch.

25. A method of supplying power, comprising:

converting a first voltage to a second voltage via a first switching regulator;

converting the first voltage to the second voltage via a second switching regulator, wherein an output of the first switching regulator is coupled to an output of the second switching regulator;

charging a first battery from the output of the first switching regulator via a first switch;

charging the first battery from the output of the second switching regulator via the first switch;

charging a second battery from the output of the first switching regulator via a second switch, the second switch being different from the first switch; and charging the second battery from the output of the second switching regulator via the second switch.

26. The method of claim 25, further comprising charging a third battery from the output of the first switching regulator via a third switch, the third switch being different from the second switch and the first switch.

27. The method of claim 25, further comprising:

converting the first voltage to a third voltage via a third switching regulator; and charging the first battery from an output of the third switching regulator, while charging the first battery from the output of the first switching regulator via the first switch.

28. The method of claim 25, further comprising:

converting the first voltage to a third voltage via a third switching regulator; and charging the second battery from an output of the third switching regulator, while charging the second battery from the output of the first switching regulator via the second switch.

* * * * *